J. WIEBE.
CABLE DRIVEN MEANS FOR OPERATING MACHINES.
APPLICATION FILED JULY 13, 1908.

908,367.

Patented Dec. 29, 1908.

2 SHEETS—SHEET 1.

Witnesses
Inventors:
John Wiebe.
Attorneys

J. WIEBE.
CABLE DRIVEN MEANS FOR OPERATING MACHINES.
APPLICATION FILED JULY 13, 1908.
908,367.
Patented Dec. 29, 1908.
2 SHEETS—SHEET 2.
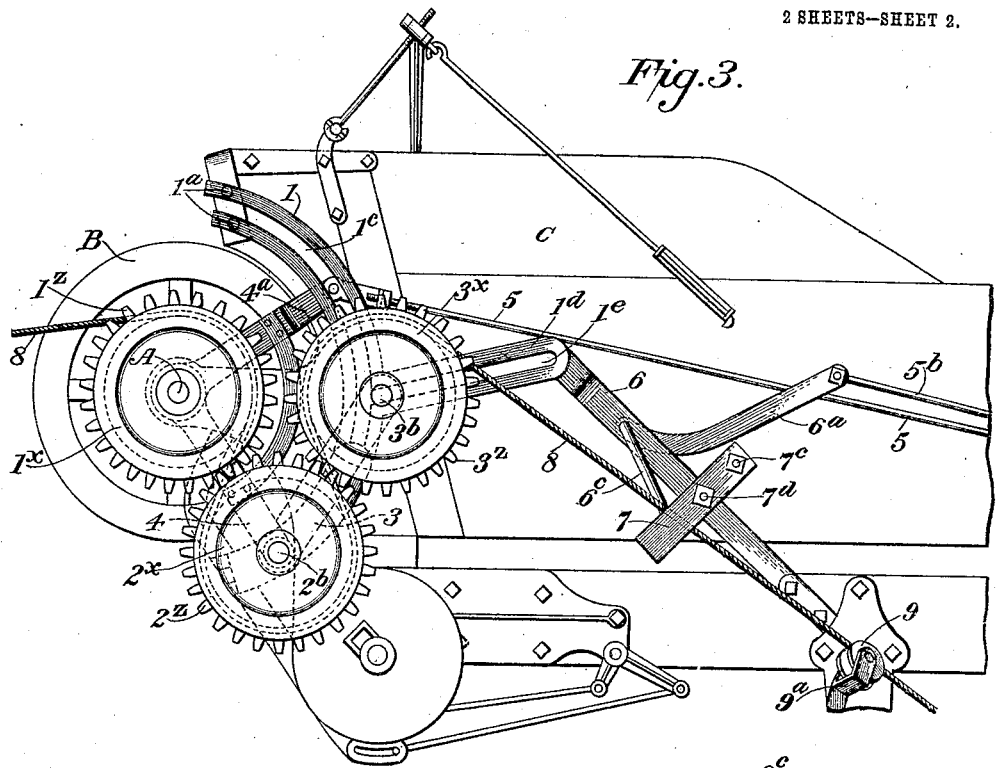
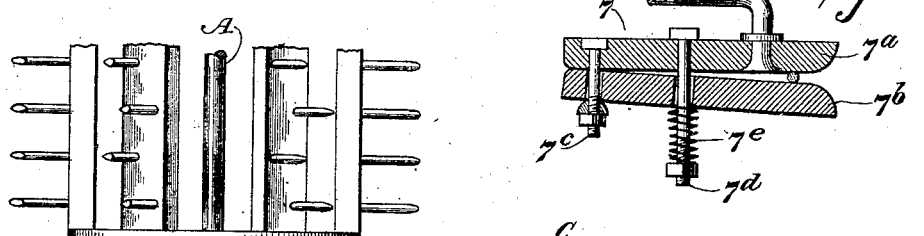

UNITED STATES PATENT OFFICE.

JOHN WIEBE, OF OTTERTAIL, MINNESOTA.

CABLE-DRIVEN MEANS FOR OPERATING MACHINES.

No. 908,367.  Specification of Letters Patent.  Patented Dec. 29, 1908.

Application filed July 13, 1908. Serial No. 443,303.

*To all whom it may concern:*

Be it known that I, JOHN WIEBE, of Ottertail, in the county of Ottertail and State of Minnesota, have invented certain new and useful Improvements in Cable-Driven Means for Operating Machines; and I hereby declare that the following is a full, clear, and exact description thereof, reference being had to the accompanying drawings, which form part of this specification.

This invention is an improvement in cable-driven means for operating machines, and is particularly adapted for use with agricultural implements such as manure spreaders, planters, seeders, and the like.

The invention relates to that class of mechanisms wherein a wire or cable may be strung across a field, from end to end of a row to be traversed by the machine; and as such machine is driven along the row the wire is utilized to rotatively operate a mechanism on the machine by means of suitable devices whereby the linear movement of the machine relative to the wire (or of the wire relative to the machine) is converted into rotary motion, and the power derived by the attachment can be utilized to operate any mechanism mounted upon the vehicle.

The present invention has particular reference to the construction of such a driving mechanism attachable to various kinds of implements or machines, or to a vehicle on which the mechanism to be operated is mounted; and I will describe the attachment as applied to a manure spreader of an approved pattern, and the claims following such description summarize the features and combinations of parts for which protection is desired.

Figure 1:
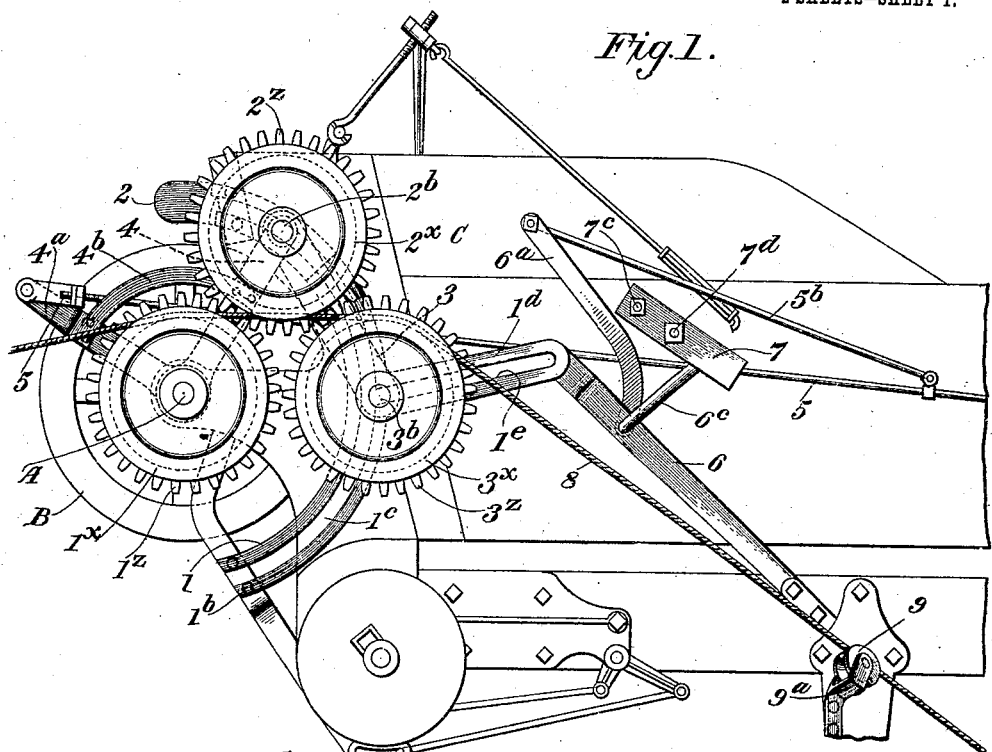
Figure 2:
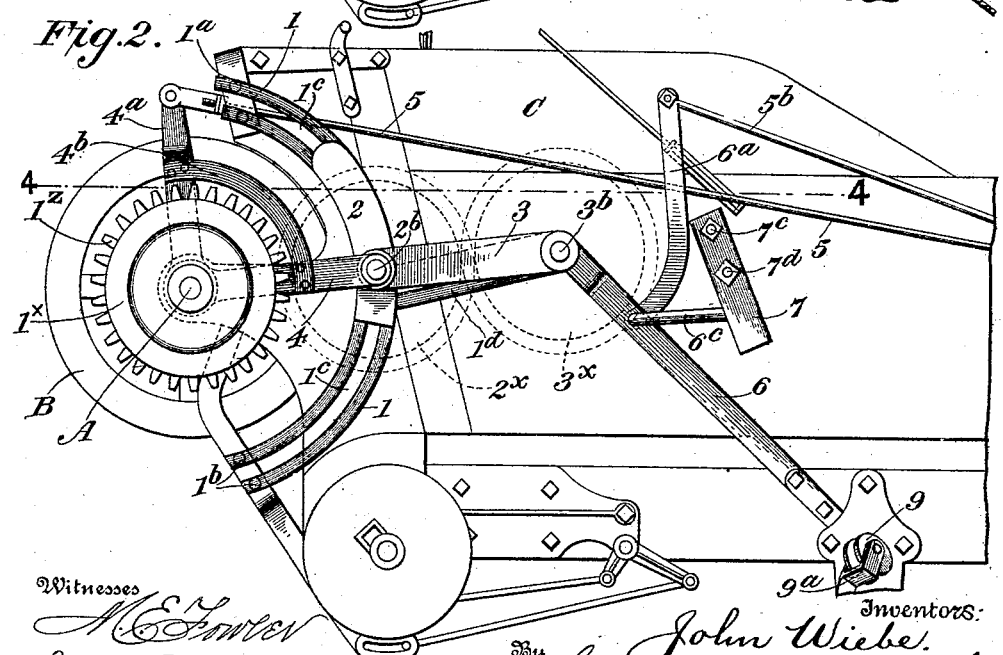

In the drawings—Figure 1 is a side elevation of the attachment as applied to a manure-spreading machine, showing the drive wheels in inoperative or idle position. Fig. 2 is a similar view with two of the drive wheels removed, but indicated in dotted lines, and showing the position of parts assumed at the intermediate position of the wheels, when shifting from idle to operative position. Fig. 3 is a view similar to Fig. 1, showing the wheels in driving position. Fig. 4 is a sectional plan view on line 4—4, Fig. 2. Fig. 5 is a detail view of the wire tension device.

A designates the driven shaft of the mechanism or attachment, and in this instance it is shown as also forming the shaft of the forking cylinder B, of a manure spreading machine of any suitable construction; such machine being only partly shown in the drawings; as it does not form part of the present invention and therefore need not be further described herein. And the driving mechanism can be applied to a variety of other uses and implements.

Attached to one of the side-frames C of the spreader body, is a metal frame or bracket, which has a portion 1 having a slot $1^c$ curved on an arc concentric to shaft A, said bracket being rigidly attached to frame C, in a position concentric to shaft A as shown at $1^a$, $1^b$, or in other suitable manner. This bracket has a projecting portion $1^d$ extending approximately radially from the center of part 1, and also slotted as at $1^e$. Mounted to move on part 1 is a slide 2, which has a part $2^a$ engaging slot $1^c$, and it also has a laterally projecting stud $2^b$, on which is rotatably mounted a wheel $2^x$.

A link 3 is pivotally connected to stud $2^b$ at one end, and its other end carries a double stud $3^b$, one end of which engages slot $1^e$, and on its outer end is mounted a wheel $3^x$.

On the outer end of shaft A is keyed a grooved wheel $1^x$, and on said shaft, beside said wheel $1^x$, is a pivoted a bell-crank lever, one arm 4 of which is connected to the slide 2, preferably at the stud $2^b$; and the other arm $4^a$ is connected to a pull-rod 5, the forward end of which can be attached to a foot or hand operated lever (not shown) at the front of the vehicle, or other convenient position for operation by the driver. The arms 4, $4^a$, may be connected by a brace $4^b$, if desired.

When arm $4^a$ is thrown back to the position indicated in Fig. 1, the slide will be raised to the top of frame 1, and the wheels $1^x$, $2^x$, $3^x$, will be in the position indicated in said figure; wheel $3^x$ being brought in close to wheel $1^x$, and wheel 2 lying above and intermediate wheels $1^x$, $3^x$. When the arm $4^a$ is shifted fully forward to the position shown in Fig. 3, slide 2 will be moved to the lower end of frame 1, and then wheel $2^x$ will be below and intermediate wheels $1^x$, $3^x$. When lever $4^a$ is shifted to intermediate position—as in Fig. 2—the wheels $1^x$, $2^x$ and $3^x$, would be in a horizontal row, as stud $2^b$ would then be at the junction of parts 1, $1^d$, and stud $3^b$ would then be at the outer or forward end of slot $1^e$.

It will be observed that wheel $3^x$ is moved outward in slot 1$^e$ as slide 2 and wheel 2$^x$ approach part 1$^d$; and wheel 3$^x$ moves inward toward wheel 1$^x$ after wheel 2$^x$ has passed above or below the slot 1$^e$.

The outer end of part 1$^d$ may be braced by a bar 6 attached to a convenient part of the machine frame, as shown, and on said bar I pivot a double armed crank, the longer arm 6$^a$, of which is pivotally connected to one end of a link 5$^b$, the other end of which may be connected to rod 5, so that the latter operates the former. On the short arm 6$^c$ of the crank is mounted a cable tensioning device 7, (see Fig. 5) which as shown is composed of two wood or metal blocks 7$^a$, 7$^b$, one of which is fast to the arm 6$^c$, while the other is attached to the first by a bolt 7$^c$ transfixing one end of both blocks, which blocks are also transfixed by a bolt 7$^d$, between the head of which and outer side of block 7$^b$ is interposed a spring 7$^e$ which tends to hold the blocks in yielding contact.

The wheels 1$^x$, 2$^x$, 3$^x$, are provided with circumferential grooves 1$^y$, 2$^y$, 3$^y$, and also with peripheral teeth 1$^z$, 2$^z$, 3$^z$, so that when they are in the position shown in Fig. 3, they will intermesh. The grooved wheels 1$^x$, 3$^x$, support a wire or cable 8, which may be of any desired construction,—a piece of twisted fence wire answers well for this purpose;—this cable is made fast at one end of row, and then passed first over a guide sheave 9 on the outer end of a guide bracket 9$^a$, attached to the machine at the lower end of bar 7,—and thence passes up over the grooved part of wheel 3$^x$, to wheel 1$^x$, and back to the other end of the row.

In the position shown in Fig. 1 wheel 2$^x$ is above wheels 1$^x$, 3$^x$, and rests lightly on the cable, but there is not sufficient frictional contact between the cable and the grooved portions of the wheels to cause the latter to operate; but when wheel 2$^x$ is lowered to the position shown in Fig. 3 a deep bight or return bend is formed in the cable and it is then held in close contact with a large portion of the grooved peripheries of the wheels 1$^x$, 2$^x$, 3$^x$, and the friction causes said wheels to powerfully rotate as the machine is traversed along the cable (or the cable traveled past the wheels); the toothed portions of the wheels being then in engagement, the total frictional power of the cable on the several wheels is transmitted therethrough to shaft A, and thus the spreading cylinder B, or any other mechanism actuated by said shaft, can be driven. The operator can, by shifting lever 4, control the starting or stopping of the wheels, and also the power which the cable exerts thereupon.

When used in fields the cable need not be changed in position except after each round trip of the machine; for after driving along the cable in one direction, the cable can be slipped off the wheels, the machine brought to the other side of the cable, and the latter reëngaged therewith and will drive the mechanism during the return trip of the machine.

The aforesaid method of arranging the cable is well understood, being substantially the same as customarily used with check-row wire-operated planters.

In order to keep the cable taut on wheels 3$^x$, 1$^x$, at all times, the tension device 7 is most useful; it is engaged with the wire, as shown in Fig. 3, intermediate the sheave 9, and the wheel 3$^x$, and keeps the wire taut, so that it is not liable to slip out of engagement with the grooved portions of the wheels.

The mechanism can obviously be usefully applied to operate other mechanisms, and to transmit power to stationary machines from a driven cable.

Having described my invention what I claim as new and desire to secure by Letters Patent is:

1. In combination, a shaft, a wheel thereon, a second wheel movable to and from the first wheel, and an intermediate wheel movable to a position above or below the first and second wheels; with a cable led between the said wheels, and adapted to drive them.

2. In combination with a shaft, a wheel thereon, a second wheel movable to and from the first wheel, a third wheel movable to a position above or below the first and second wheels, said wheels being provided with toothed peripheral portions adapted to intermesh when the wheels are in operative position; with a driving cable led between the said wheels.

3. In combination, a shaft, a grooved wheel thereon, a second wheel movable to and from the first wheel, and a third wheel movable to a position above or below the first and second wheels; with a cable led between the intermediate wheel and the other wheels, and supporting means for said wheels and shaft movable along the length of the cable.

4. In combination, a shaft, a grooved wheel thereon, a second wheel, a third intermediate wheel movable to a position above or below the wheels, said wheels being provided with toothed peripheral portions adapted to intermesh when the wheels are in operative position; with a cable led between the wheels, and supporting means for said wheels and shaft movable along the length of the cable.

5. In combination, a vehicle, and a mechanism thereon having a shaft, with means for driving said shaft, comprising a wheel keyed to the shaft, a longitudinally movable wheel, a lever pivoted on the shaft, a third wheel connected with said lever, a connection between the said lever and said movable wheel, and means for operating the lever to bring the intermediate wheel above or below the path of movement of the movable wheel; and a cable led between said wheels and adapted to operate the same.

6. In combination, a shaft, and means for driving said shaft comprising a wheel keyed to the shaft, a longitudinally movable slide, a wheel mounted on said slide, a lever pivoted on the shaft, a third wheel connected with said lever, a connection between the said lever and said slide whereby said wheels can be shifted to move the intermediate wheel above or below the path of movement of the slide and its wheel; with a cable led between said wheels and adapted to operate the same.

7. In combination, a vehicle, a mechanism thereon having a shaft, and means for driving said shaft comprising a grooved wheel keyed to the shaft, a longitudinally movable slide, a grooved wheel mounted on said slide, a lever pivoted on the shaft, a third grooved wheel connected with said lever, a connection between the said lever and said slide; with a cable led between said wheels and adapted to operate the same as the vehicle is moved along the length of the wire; and a slack take-up device in advance of the first wheel.

8. In combination with a vehicle, a mechanism thereon having a shaft, and means for driving said shaft comprising a wheel keyed to the shaft, a longitudinally movable slide, a second wheel mounted on said slide, a lever pivoted on the shaft, a third wheel connected with said lever, a connection between the said lever and said slide, said second and third wheels being shiftable so that the second wheel can be brought above or below the path of movement of the third wheel; with a cable led between said wheels and adapted to operate the same as the vehicle is moved along the length of the wire; and means operable by the driver for controlling the position of the second wheel.

9. In combination, a shaft, a wheel thereon, a bracket fixed beside said shaft having a guide-slot concentric with the shaft, and a radially extending guide-slot, a wheel support mounted to move in said concentric slot, a wheel support mounted to move in said radial guide-slot, a wheel on the latter support, connections between the said wheel supports and devices for shifting said wheel supports.

10. In combination, a driven shaft, a grooved wheel thereon, a bracket fixed beside said shaft having a guide-slot concentric with the shaft and a radially extending guide-slot, a wheel support mounted to move in said concentric slot, a grooved wheel on said support, a wheel support mounted to move in said radial guide-slot, a grooved wheel on the latter support, connections between the said wheel supports, and a lever pivoted on the shaft for shifting said wheel supports.

11. In combination with a driven shaft, a grooved wheel thereon, a bracket fixed beside said shaft, a wheel support mounted to move on said bracket concentric with the shaft, a grooved wheel on said support, a radially movable support mounted on said bracket, a grooved wheel on the latter support; connections between the wheel supports, devices for shifting said wheel supports so as to shift said wheels, and a cable led between said wheels and adapted to drive the latter when they are shifted in one position.

12. In combination, a vehicle, a mechanism thereon having a shaft, a grooved wheel on said shaft, a bracket fixed beside said shaft having a grooved guide-slot concentric with the shaft, a wheel support mounted to move in said slot, a grooved wheel on said support; a radially extending arm having a guide-slot, a wheel support mounted to move in said guide-slot a grooved wheel on the latter support, a connection between the wheel supports in said slots; means for shifting said supports, a cable led between said wheels and adapted to drive the latter when they are shifted in one position and the vehicle is moved along the line of the cable, and a slack take-up device for the cable.

In testimony that I claim the foregoing as my own, I affix my signature in presence of two witnesses.

JOHN WIEBE.

Witnesses:
 H. H. BRUTLAG.
 E. H. WIEBE.